United States Patent
Grabowski et al.

(10) Patent No.: US 7,608,011 B2
(45) Date of Patent: Oct. 27, 2009

(54) HYDROGEN FUELLED HYBRID POWERTRAIN AND VEHICLE

(75) Inventors: Tony Grabowski, Sterling Heights, MI (US); Arun Jaura, Canton, MI (US); Walt Ortmann, Saline, MI (US); Robert Natkin, Canton, MI (US); Steve Szwabowski, Northville, MI (US); Edward Jih, Troy, MI (US); Bret Oltmans, Stacy, MN (US); Adam Denlinger, Saline, MI (US); Jaswant-Jas Dhillon, Canton, MI (US); Yin Chen, Dearborn, MI (US); Brad Boyer, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 270 days.

(21) Appl. No.: 10/541,055

(22) PCT Filed: Dec. 10, 2003

(86) PCT No.: PCT/IB03/05817

§ 371 (c)(1),
(2), (4) Date: Mar. 6, 2006

(87) PCT Pub. No.: WO2004/060708

PCT Pub. Date: Jul. 22, 2004

(65) Prior Publication Data

US 2006/0174624 A1  Aug. 10, 2006

Related U.S. Application Data

(60) Provisional application No. 60/437,906, filed on Jan. 4, 2003, provisional application No. 60/482,641, filed on Jun. 26, 2003, provisional application No. 60/482,735, filed on Jun. 27, 2003, provisional application No. 60/493,525, filed on Aug. 11, 2003, provisional application No. 60/512,832, filed on Oct. 20, 2003.

(51) Int. Cl.
*B60W 10/08* (2006.01)
*B60K 1/00* (2006.01)
(52) U.S. Cl. .......................................... 477/5; 180/65.2
(58) Field of Classification Search .................. 477/3, 477/5; 475/5; 180/65.2–65.4; 903/925, 903/940, 941, 942, 944; 60/709, 710
See application file for complete search history.

(56) References Cited

U.S. PATENT DOCUMENTS

| 4,317,439 | A | * | 3/1982 | Emmerling | ................. 123/563 |
| 4,332,219 | A | | 6/1982 | Gonzalez | |
| 4,688,425 | A | | 8/1987 | Kanehara et al. | |

(Continued)

FOREIGN PATENT DOCUMENTS

EP  0420599 A  4/1991

(Continued)

*Primary Examiner*—Roger Pang
(74) *Attorney, Agent, or Firm*—David B. Kelley; Brooks Kushman P.C.

(57) ABSTRACT

A hydrogen-powered hybrid powertrain system includes a hydrogen-fuelled internal combustion engine operating at a lean air/fuel mixture, and a supercharger for boosting a primary drive torque produced by the engine primarily over a high operating speed range. An electric motor/generator generates a secondary drive torque for the vehicle, such that the secondary drive torque complements the boosted primary drive torque over at least a low operating speed range of the powertrain. A disconnect clutch disposed between the engine and the motor/generator engages and disengages the engine from the motor/generator, and serves to transfer the boosted primary driver torque through the motor/generator and to a power transmission system. The input at the power transmission is thus a combination of the boosted primary drive torque and the secondary drive torque having an enhanced torque characteristic over at least the low operating speed range.

20 Claims, 10 Drawing Sheets

U.S. PATENT DOCUMENTS

| | | | | |
|---|---|---|---|---|
| 4,989,562 | A * | 2/1991 | Ohkumo et al. | 123/198 D |
| 5,317,924 | A * | 6/1994 | Maack | 73/756 |
| 5,359,968 | A | 11/1994 | Shiraishi et al. | |
| 5,698,043 | A | 12/1997 | Acevedo | |
| 6,148,784 | A * | 11/2000 | Masberg et al. | 123/192.1 |
| 6,338,391 | B1 * | 1/2002 | Severinsky et al. | 180/65.2 |
| 6,365,983 | B1 | 4/2002 | Masberg et al. | 290/40 C |
| 6,446,616 | B1 | 9/2002 | Kabat et al. | |
| 6,554,088 | B2 * | 4/2003 | Severinsky et al. | 180/65.2 |
| 6,659,212 | B2 * | 12/2003 | Geisse et al. | 180/65.2 |
| 2002/0094908 | A1 * | 7/2002 | Urasawa et al. | 477/3 |
| 2002/0098414 | A1 | 7/2002 | Ovshinsky et al. | |

FOREIGN PATENT DOCUMENTS

| | | | |
|---|---|---|---|
| GB | 2005348 A | | 4/1979 |
| JP | 59119299 | | 10/1984 |
| JP | 62247152 A | | 10/1987 |
| JP | 63198762 | | 8/1988 |
| JP | 02102327 | | 4/1990 |
| JP | 11093681 | | 4/1999 |
| JP | 02001248491 A | * | 9/2001 |
| JP | 2002525022 A | | 8/2002 |
| WO | WO 02/078987 A | | 10/2002 |

* cited by examiner

HYDROGEN FUELLED HYBRID POWERTRAIN AND VEHICLE

CLAIM OF PRIORITY

This application claims priority to the following U.S. Provisional Applications: U.S. Ser. No. 60/437,906 filed Jan. 4, 2003, U.S. Ser. No. 60/482,641 filed Jun. 26, 2003, U.S. Ser. No 60/482,735 filed Jun. 27, 2003, U.S. Ser. No. 60/493,525, filed Aug. 11, 2003, and U.S. Ser. No. 60/512,832, filed Oct. 20, 2003.

FIELD OF THE INVENTION

The present invention relates generally to hybrid electric vehicles, and more particularly to a hybrid electric powertrain and vehicle powered by a hydrogen-fuelled internal combustion engine.

BACKGROUND ART

Automotive manufacturers in recent years have intensified research and development efforts to implement and commercialise more quickly vehicular fuel cell and gasoline hybrid electric vehicle (HEV) technologies. Fuel cell technologies utilize electro-chemical conversion devices, such as PEM and solid oxide fuel cells, to generate drive power with zero tailpipe emissions. Gasoline hybrids, while not completely eliminating tailpipe emissions, can significantly improve fuel economy at a fraction of the cost of present-day fuel cell technologies.

Alternatively, powertrains combining the benefits of hydrogen-powered internal combustion engines and hybrid electric functionality have been proposed. In U.S. Patent Application Publication 2002/0098414, for example, a very low emission hybrid electric vehicle is disclosed having a hydrogen-powered internal combustion engine, a metal hydride hydrogen storage unit, an electric motor and a nickel metal hydride battery. The problem however, due to the low power density of hydrogen gas when used in an internal combustion engine, is the ability of the powertrain to deliver gasoline engine-like performance over a wide range of operating speeds. This is so because hydrogen internal combustion engines are usually operated with a fuel-lean air/fuel ratio in order to preserve combustion stability.

As such, the inventors herein have recognized the need to adapt conventional internal combustion engine and HEV technologies to utilize hydrogen fuel and thus achieve substantial reductions in tailpipe emissions while maintaining hybrid functionality and performance comparable to conventional gasoline-powered engines.

SUMMARY OF THE INVENTION

In accordance with a first aspect of the invention, there is provided a powertrain, comprising a primary power generating system for generating a primary drive torque, the primary power system having a hydrogen-fuelled internal combustion engine operating with a lean hydrogen gas fuel mixture, the internal combustion engine having at least one air charge boosting device for increasing the primary drive torque at a range of operating speeds of the powertrain; and a secondary power generating system having at least one electric torque generating device for generating a secondary drive torque, the secondary power generating system being constructed and arranged such that the secondary drive torque complements the boosted primary drive torque over at least a low operating speed range of the powertrain.

Preferably, a disconnect clutch is disposed between the primary generating power system (engine) and the secondary power generating system (electric motor) for engaging and disengaging the primary power generating system from the secondary power generating system and for transferring the boosted primary driver torque through the secondary power generating system. A power transmission system coupled to the output of the secondary power generating system for receiving a combination of the boosted primary drive torque and the secondary drive torque, the combination of the boosted primary drive torque and the secondary drive torque having an enhanced torque characteristic over at least the low operating speed range of the powertrain.

Because the internal combustion is operated at a lean air/fuel ratio using lower power density hydrogen, supercharging is provided to boost the output torque of the engine. Supercharging improves performance at higher engine speeds, but not at lower engine speeds. Advantageously, the output torque of the electric motor complements the engine output torque at lower engine speeds so that the combined ICE/hybrid powertrain performs more like a conventional gasoline-powered powertrain, but with substantially reduced hydrocarbon and $CO_2$ emissions, and with the benefits of hybrid functionality, i.e., start/stop, electric mode, launch assist and kinetic energy recovery.

By utilizing a hydrogen-powered HEV powertrain, significant improvements in emissions and fuel economy can be achieved, as compared with a regular production vehicle, but at a lower cost than a comparable fuel cell powered vehicle. As a result of the cost advantages, the claimed hydrogen-powered HEV vehicle can create a greater demand and thus accelerate the development of the hydrogen infrastructure ultimately required for hydrogen fuel cell vehicles.

The invention will now be described further, by way of example, with reference to the accompanying drawings, in which.

Figure 6:
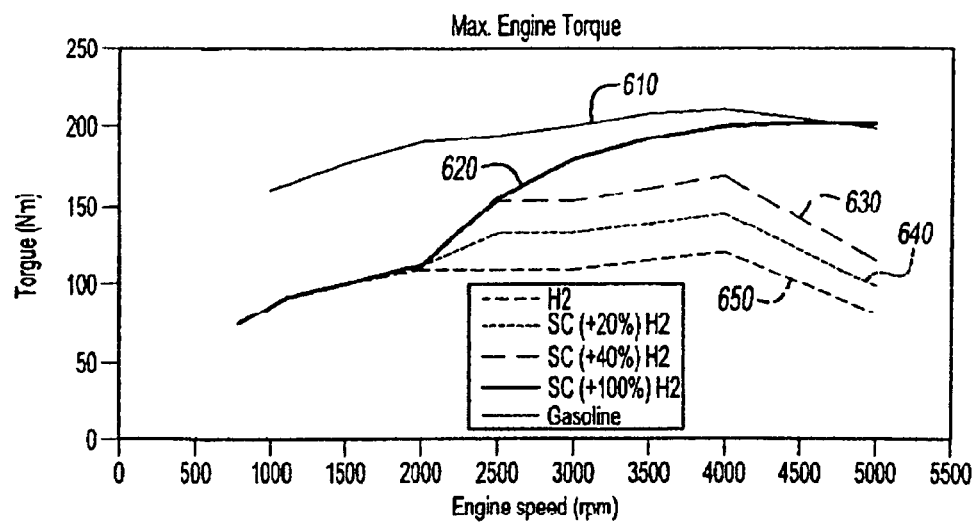
Figure 7:
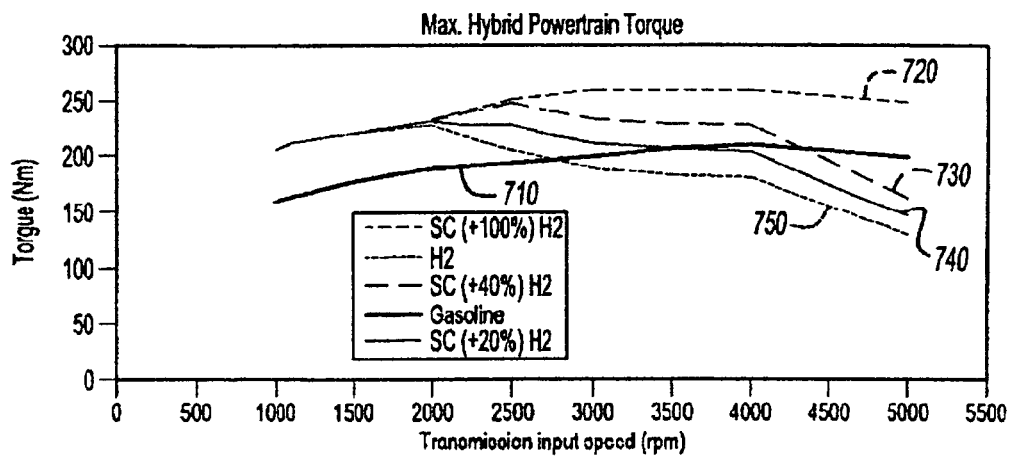
Figure 8:
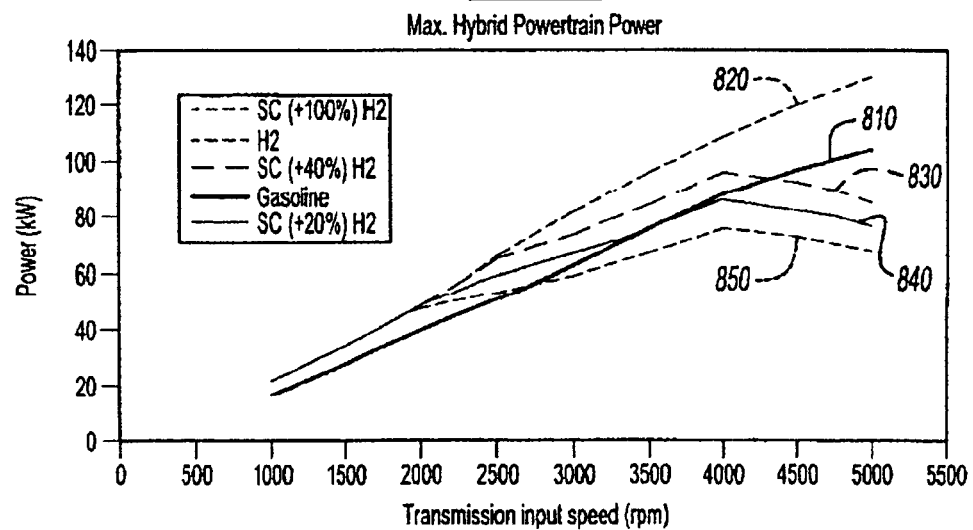
Figure 9:
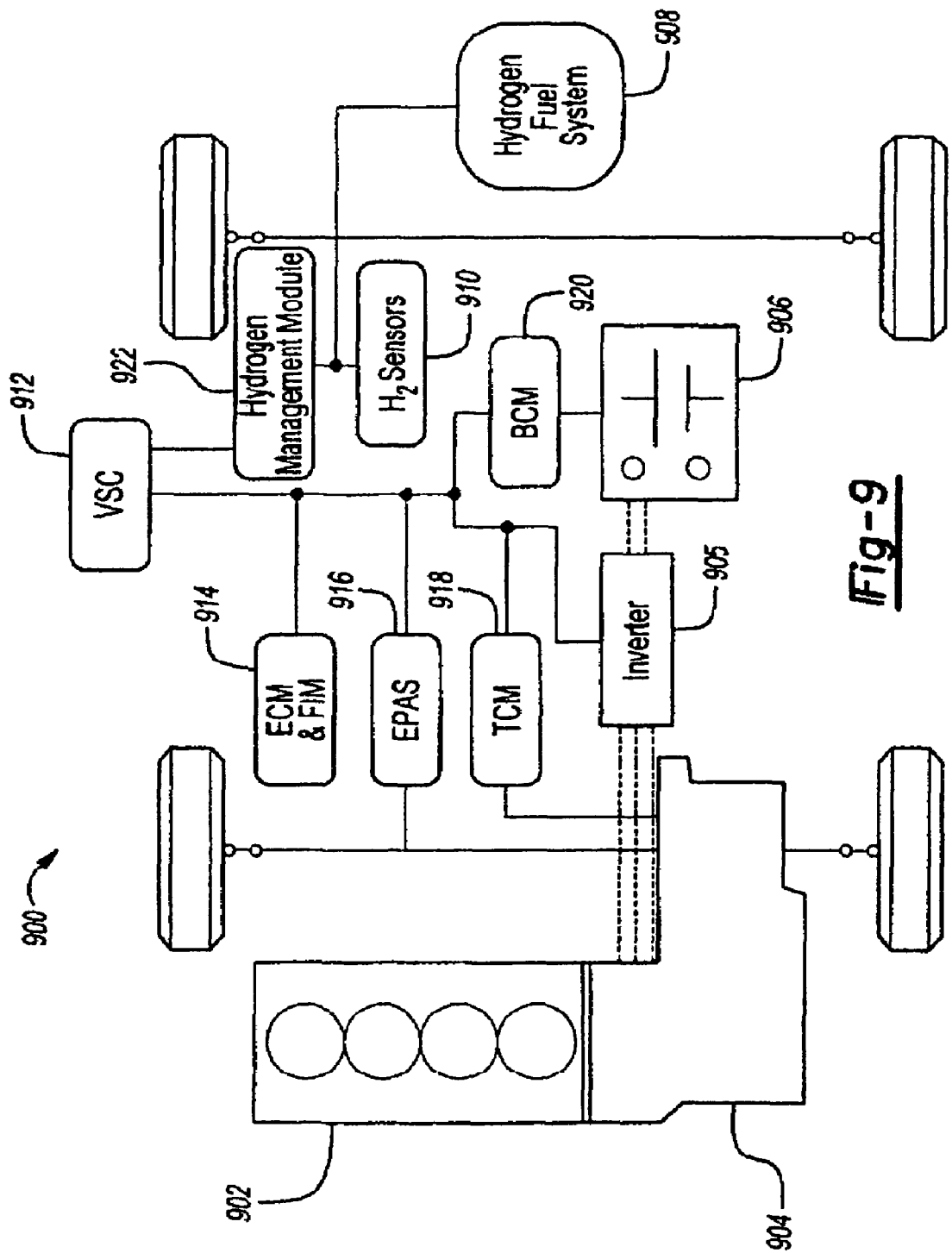
Figure 10:
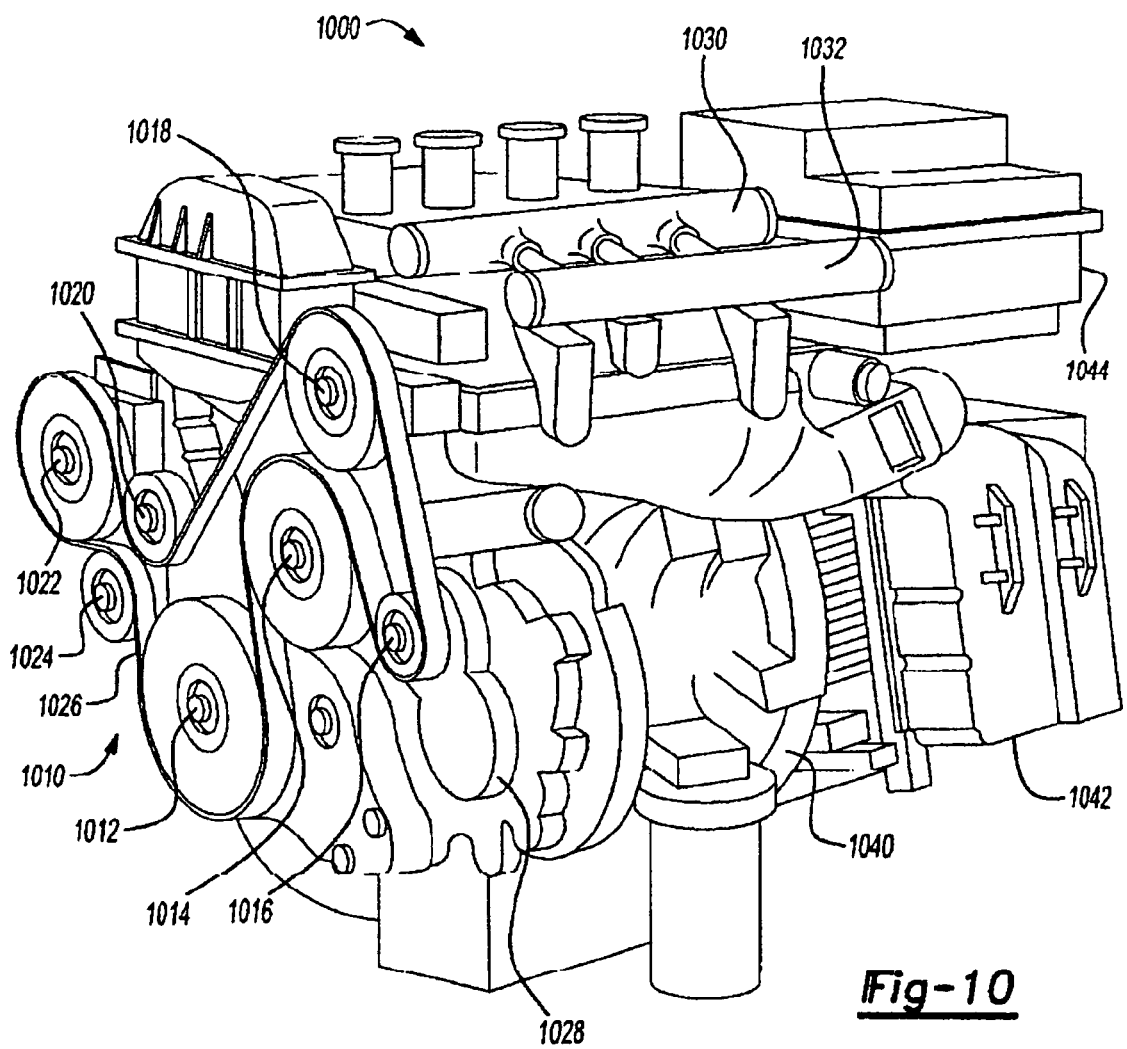
Figure 11:
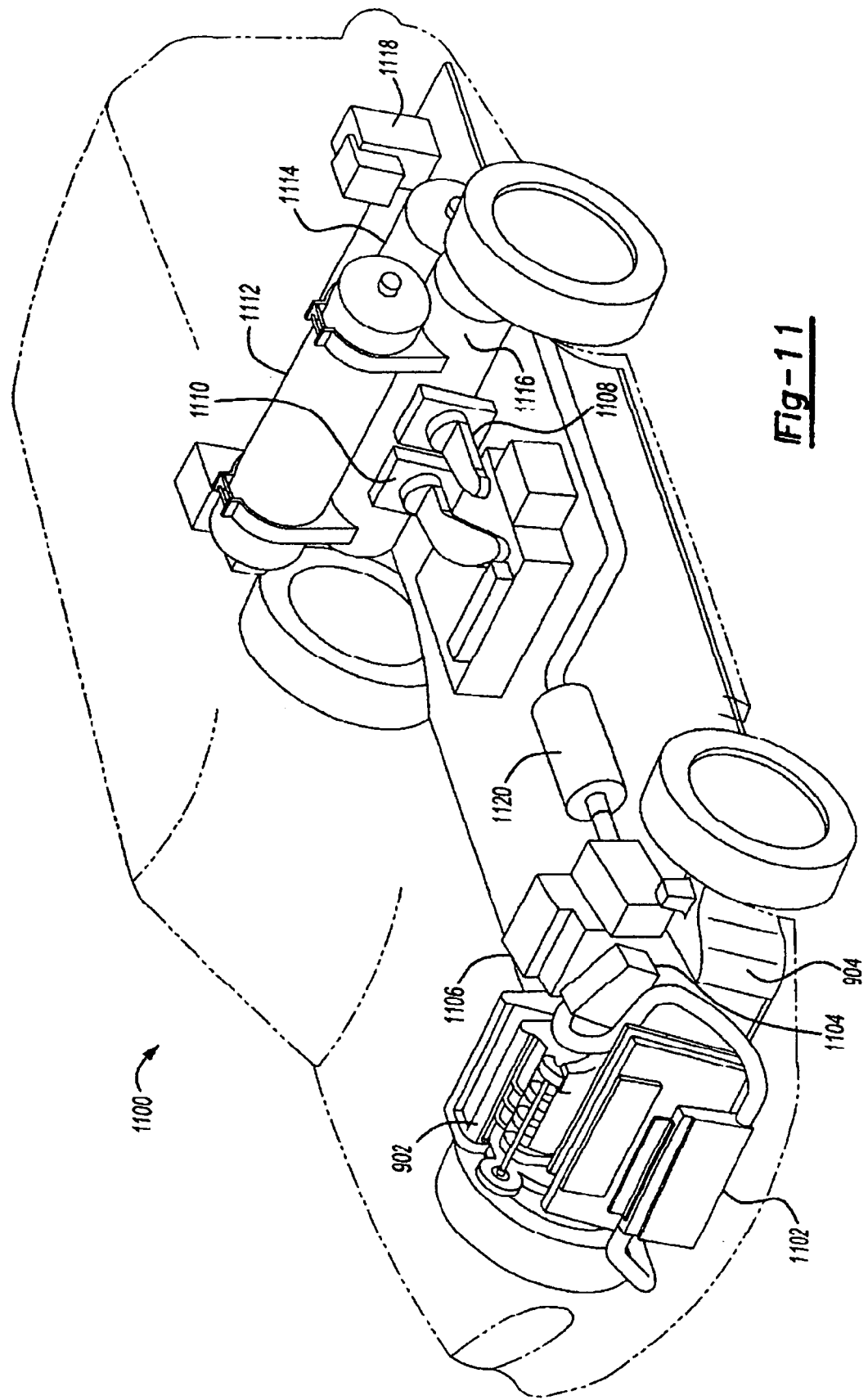
Figure 12:
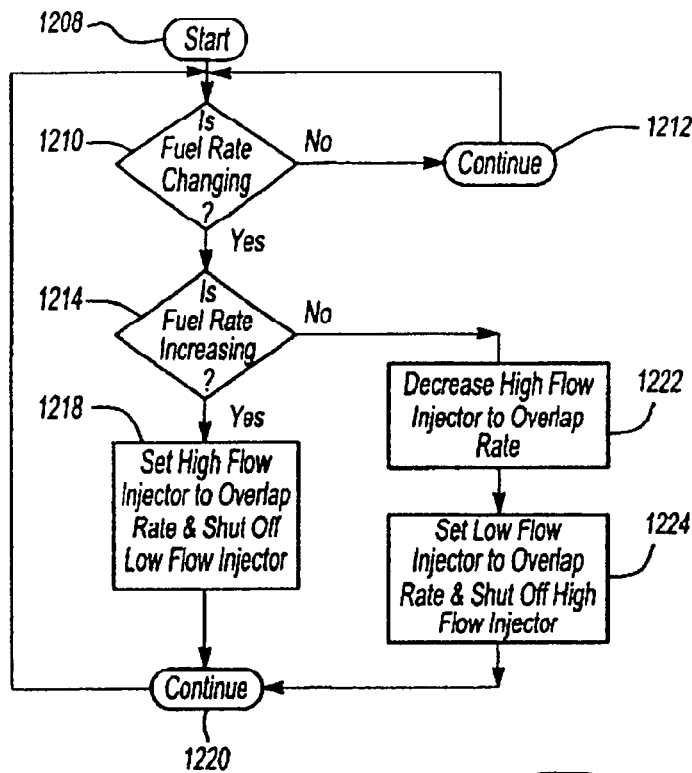
Figure 13:
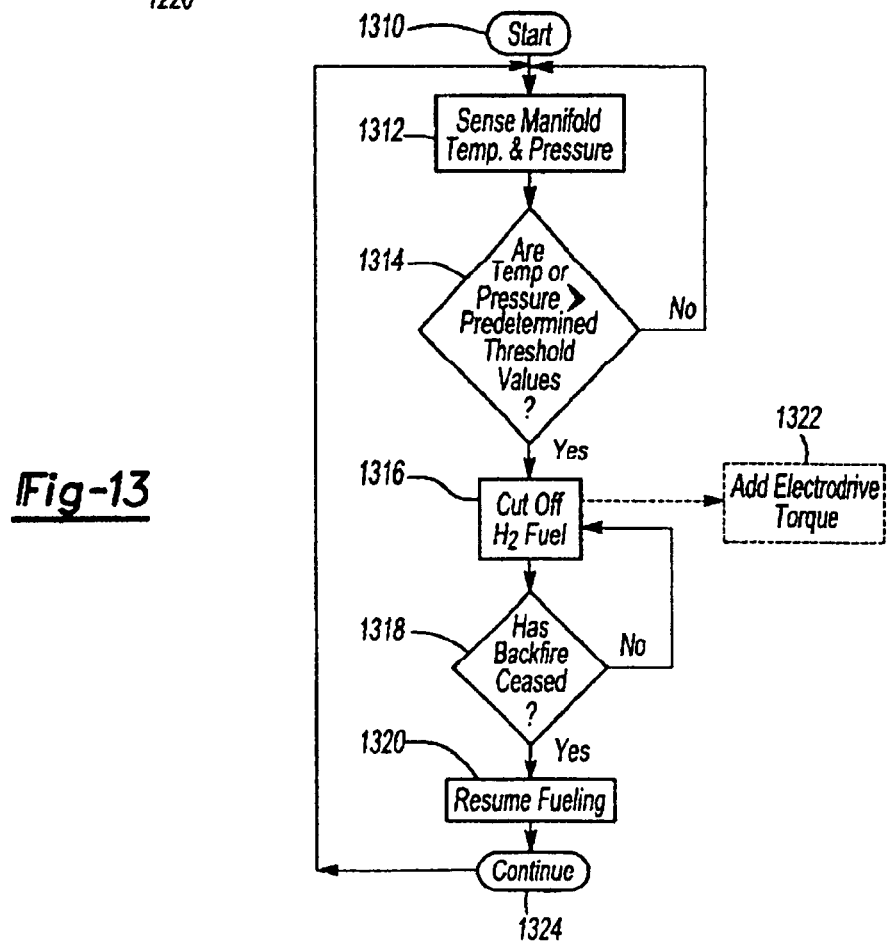

FIG. 6 includes plots of torque versus speed characteristics for non-hybrid powertrain systems;

FIG. 7 includes plots of torque versus speed characteristics for hybrid powertrain systems according to the present invention;

FIG. 8 includes plots of power versus speed characteristics for hybrid powertrain systems according to the present invention;

FIG. 9 is a schematic diagram showing an example of a vehicle having a hydrogen-fuelled internal combustion engine and modular hybrid transmission system according to the present invention;

FIG. 10 is an isometric view of a hydrogen hybrid powertrain system according to the present invention;

FIG. 11 is an isometric view of a vehicle having a hydrogen hybrid powertrain according to the present invention;

FIG. 12 is a flow chart of a method for changing fuel flow with hydrogen fuel injectors having different maximum flow rates; and FIG. 13 is a flow chart of a method for sensing an intake manifold backfire in a hydrogen-fuelled internal combustion engine according to the present invention.

DETAILED DESCRIPTION OF THE PREFERRED EMBODIMENTS

Figure 1:
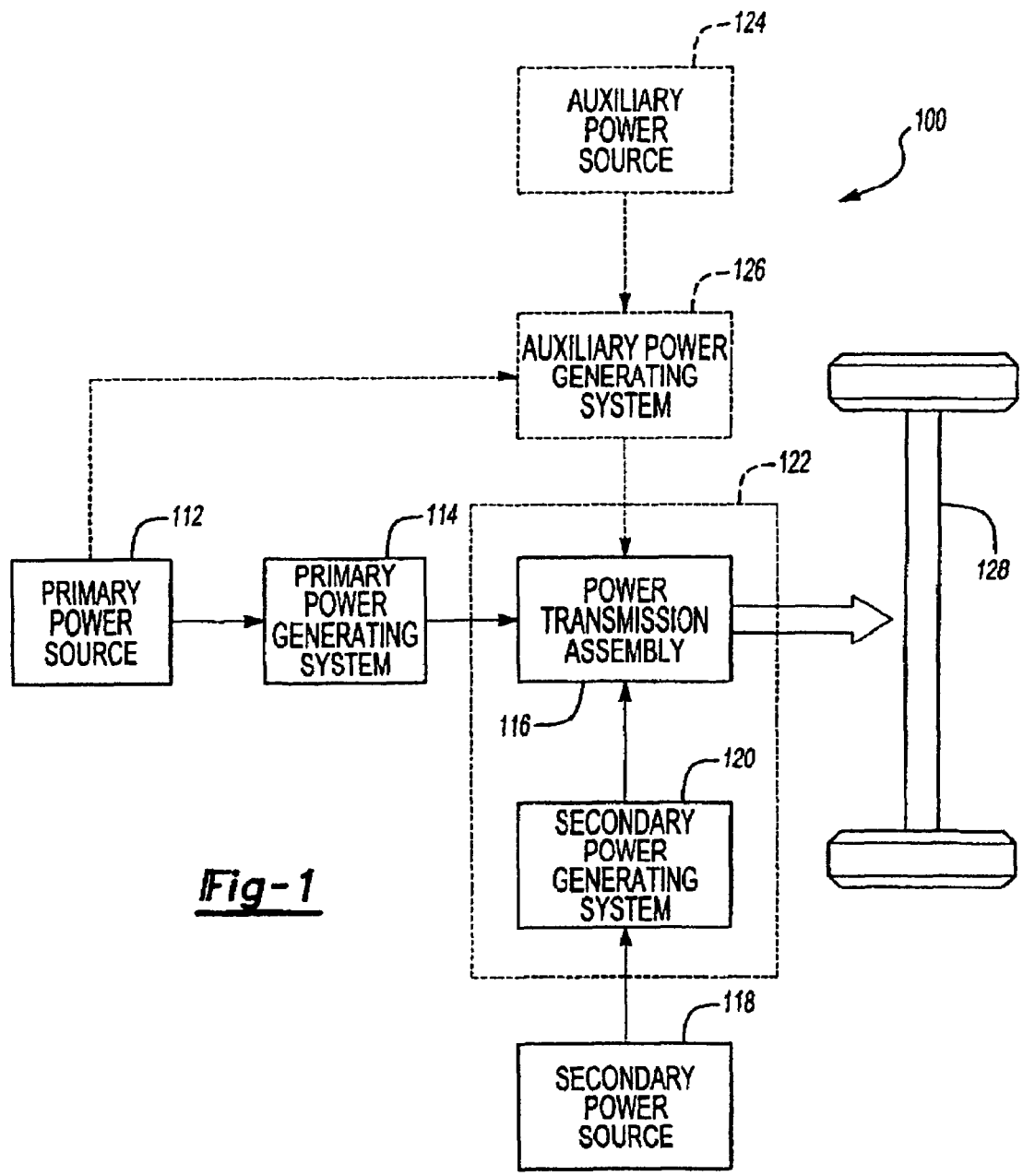
FIG. 1 is a schematic block diagram showing a generic representation of a hybrid powertrain system.

FIG. 1 shows a generic architecture for a hybrid vehicle system 100 in accordance with the present invention. The system 100 includes a primary power source 112, such as a gasoline, diesel or other gas fuel supply, coupled to a primary power generating system 114, such as an internal combustion engine. The primary power generating system 114 generates a primary drive torque that is transmitted to the vehicle's driveline 128 via power transmission assembly 116.

The power transmission assembly 116 can be a conventional manual, automatic or continuously variable automotive transmission, or other equivalent gearing mechanism for transmitting mechanical power produced the primary power generating system 114. The system 110 further includes a secondary power source 118, such as a battery, ultra capacitor, hydraulic accumulator or other energy storage device, and secondary power generating system 120, such as one or more electric machines or other torque generating devices, for supplementing the drive torque delivered by the primary power generating system 114. The system may further include an auxiliary power source 124 coupled to an auxiliary power generating system 126, such as a fuel cell system or Auxiliary Power Unit (APU), for providing additional drive torque.

In accordance with one embodiment of the present invention, the primary power generating system 114 is a hydrogen-burning internal combustion engine. The hydrogen power source 112 can include compressed hydrogen gas storage system, or a low-pressure system such as a metal hydride storage system. Power transmission assembly 116 transmits the output of both the internal combustion engine 114 and the secondary power generating system 120 to the vehicle driveline 128. The power transmission assembly 116 is preferably a converter-less automatic transmission constructed and arranged with the secondary power generating system 120, preferably an integrated high voltage electric motor/generator. Advantageously, the power transmission assembly 116 and secondary power generating system 120 can be packaged into a single modular hybrid transmission unit 122.

Figure 2A:
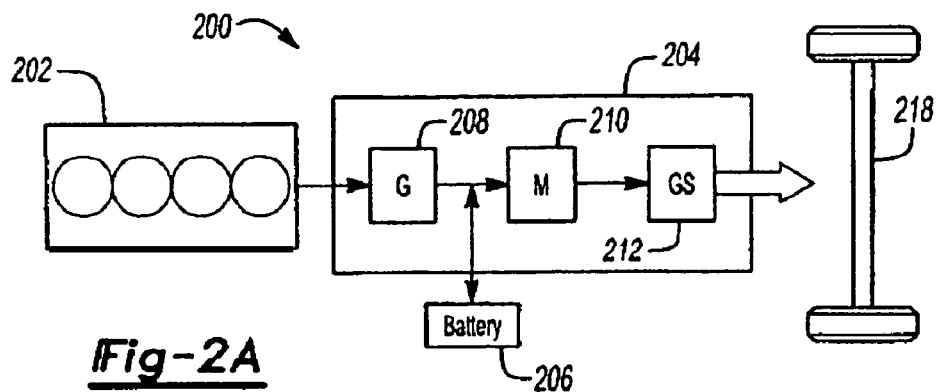
FIGS. 2a through 2c are schematic block diagrams illustrating examples of various power transmission units applicable to the generic hybrid powertrain system representation of FIG. 1.
Figure 2B:
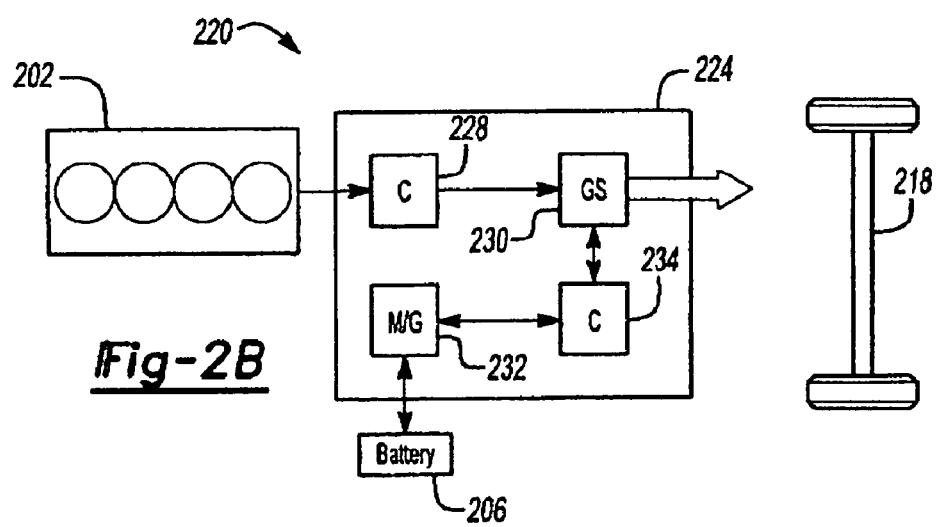
Figure 2C:
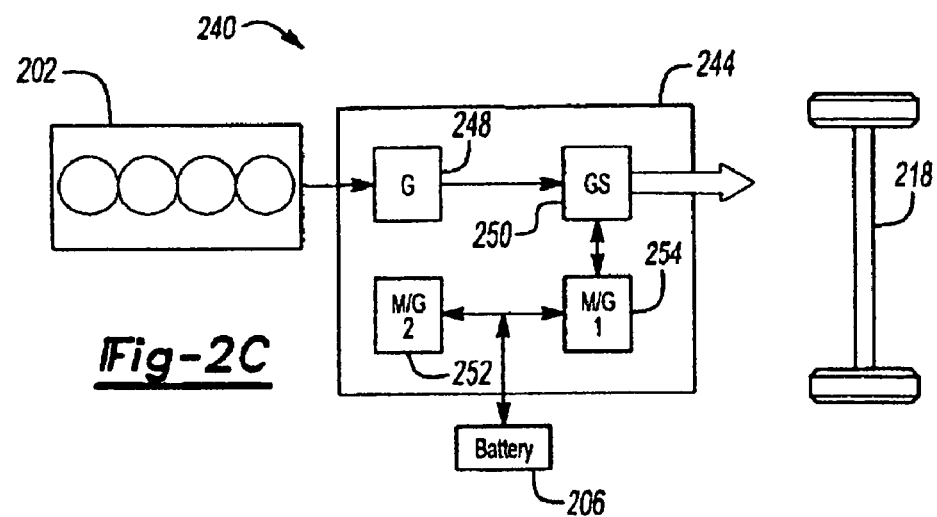

FIGS. 2a through 2c show exemplary hybrid powertrain system configurations applicable to the present invention. FIG. 2a shows a so-called "series" hybrid configuration 200 having a hydrogen-fuelled internal combustion engine 202 coupled to a modular hybrid transmission unit 204. Modular hybrid transmission unit 204 includes an electric generator 208 that produces electrical energy for powering the vehicle drive wheels 218 via an electric motor 210 and gearset 212. Electrical storage device 206 stores electrical energy via the generator 208 when the internal combustion engine produces more power than required, and supplements the engine power via the electric motor 210 when power demand is exceeds than the engine power output. FIG. 2b shows a so-called "parallel" hybrid configuration 220, wherein a modular hybrid transmission unit 224 delivers driveline torque via a first power path having the hydrogen-fuelled internal combustion engine 202, a coupling device 228, and a gearset 230, and a second power path having a motor/generator 232, a coupling device 234 and the gearset 230. The coupling devices 228 and 234 can be any suitable devices, for example a gearset or clutch, for transmitting mechanical energy to the vehicle driveline 218. In one embodiment, the coupling devices 228 and 234 can be the same device. FIG. 2c shows a so-called "parallel-series" configuration 30 wherein a modular hybrid transmission unit 244 includes motor/generators 252 and 253 electrically and/or mechanically coupled, for example via a planetary gearset, to deliver power to a gearset 250 and driveline 218.

Figure 3:
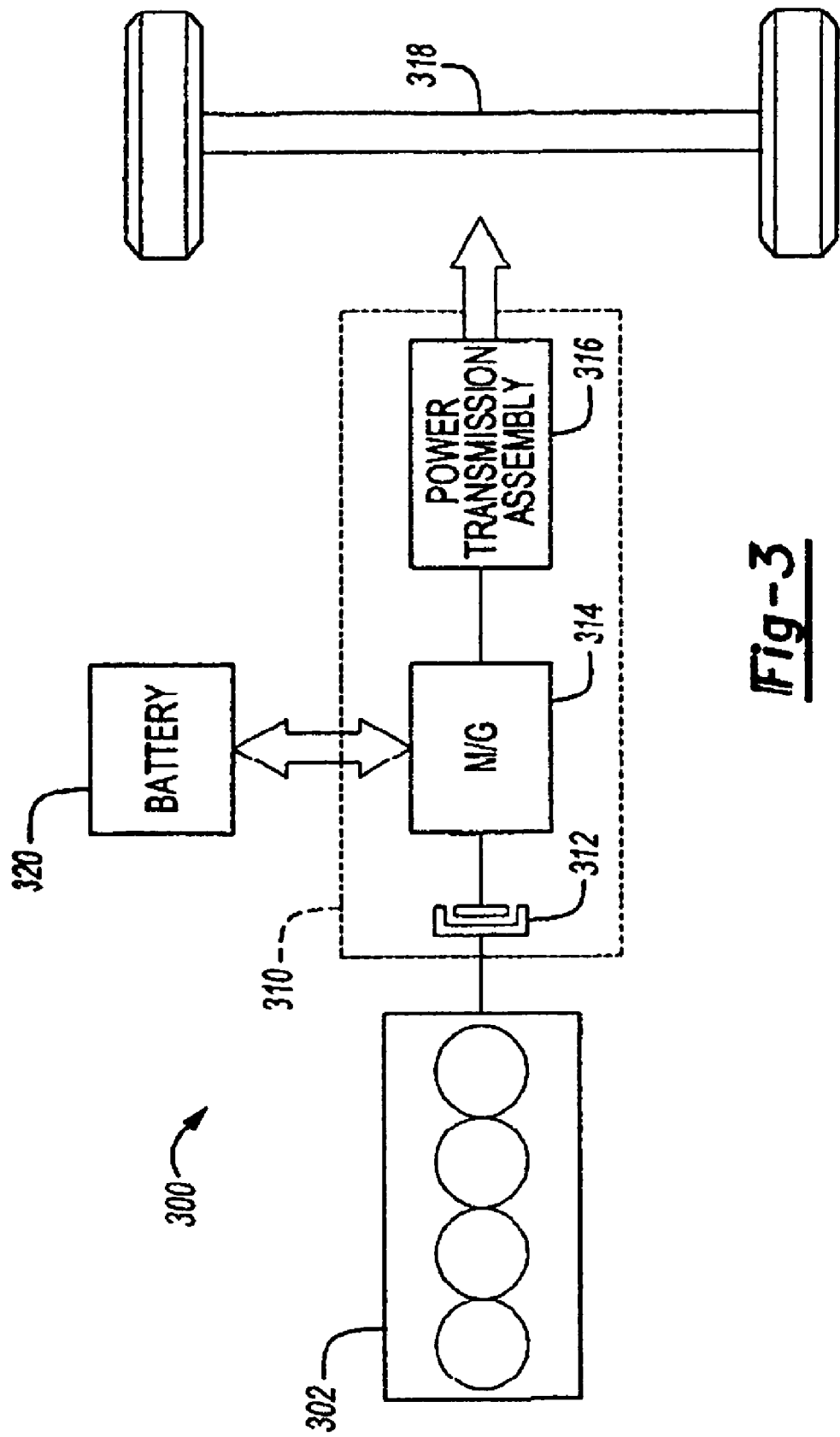
FIG. 3 is block schematic diagram of an exemplary hybrid powertrain according to the present invention.

FIG. 3 shows a block schematic diagram of an exemplary hybrid powertrain system 300 according to the present invention. The system 300 includes a hydrogen-fuelled internal combustion engine 302, an embodiment of which is described below with reference to FIG. 4, and a modular hybrid transmission system 310, an embodiment of which is described below with reference to FIG. 5. The modular hybrid transmission system 310 includes a clutch mechanism 312 that can be selectively engaged and disengaged to operate the powertrain 300 as a parallel hybrid system. When the a clutch mechanism 312 is engaged, the torque output of engine 302 is transmitted to supplement the torque output of a motor/generator 314, which is coupled to a battery 320. When operated as motor, the motor/generator 314 uses electric energy stored in battery 320, and when operated as a generator, the motor/generator 314 provides electrical charge to the battery 320.

Figure 4:
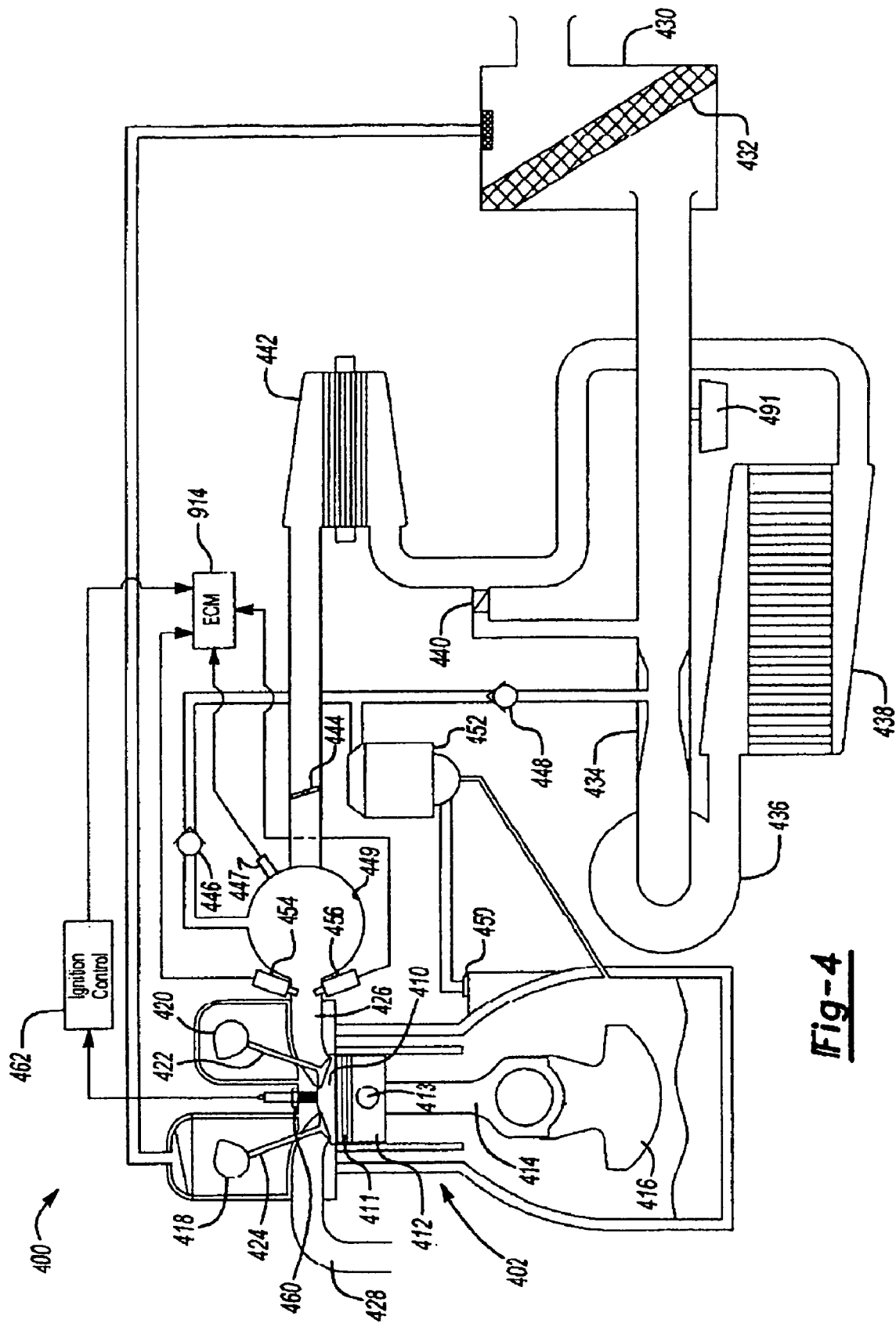
FIG. 4 is a schematic diagram showing an embodiment of hydrogen-fuel internal combustion for use in the hybrid powertrain of FIG. 3.

FIG. 4 shows a schematic diagram of hydrogen-fuelled internal combustion engine 400 for use as part of the hybrid powertrain system of FIG. 3. The engine 400, by way of example and not limitation, is a hydrogen gas burning, four-stroke, port fuel injected internal combustion engine having a plurality of cylinders 402 (only one shown), with each of the cylinders having a combustion chamber 410 and a corresponding reciprocating piston 412 cooperating with a connecting rod 414 and a crankshaft 416. In accordance with one embodiment, the piston 412 is optimised for a compression ratio of approximately 12.2:1 and is constructed from forged aluminium piston. Piston 412 also features a substantially flat piston head and a ring pack 411 optimised for 120 bar peak cylinder pressure. A fully floating, bush-type piston pin 413 attaches the piston 412 to connecting rod 414, which is machined from 4340 steel and shortened, compared to a similar gasoline engine connecting rod, to accommodate the ring pack 411.

A plurality of camshaft assemblies 418 and 420 are mechanically coupled with intake and exhaust valves 422 and 424, respectively, which are operated to communicate with respective intake and exhaust manifolds. Preferably, the valves 422 and 424 included a Stellite(r) facing and hardened valve seats to improve wear resistance due to reduced lubricity of the hydrogen fuel A dual rail fuel injector system, shown collectively by reference numerals 454 and 456, includes high fuel flow rate injectors 454 (only one shown) and low fuel flow injectors 456 (again only one shown). The injectors 454 and 456, preferably disc-type gaseous fuel injectors, are controlled by an engine control module (ECM) 914 (see FIG. 9), which regulates the supply of hydrogen fuel from a compressed gas, metal hydride or other hydrogen storage medium. Because hydrogen has a very wide combustion range, ECM 914 nominally operates the fuel injectors 454 and 456 to provide a lean air/fuel mixture in each of the combustion chambers 410. By way of example and not limitation, the engine 400 can be operated with an air/fuel ratio of approximately 86:1 during highway cruising, compared to approximately 14.7:1 with a similar conventional gasoline-powered engine.

Operation of the engine 400 in a lean regime allows improved fuel efficiency without pre-ignition or so-called engine "knock." In one embodiment, low flow rate injectors 456 are operated at low engine speed, and high flow rate injectors 454 are operated at high engine speeds. Fuel is injected into each of the combustion chambers 410 only when the intake valve 422 is open and the exhaust valve 424 is closed. This "late fuel injection timing" allows for induction air cooling of the exhaust valve 424 during overlap period, so as to minimize occurrence of backflash/backfire. Advantageously, the "end of injection timing" is fixed at 180 degrees (BDC of intake stroke) with a period of 20 to 170 degrees such that fuel is never injected before the exhaust valves are closed.

Fuel injectors 454 and 456 have partially overlapping flow rates. In other words, the minimum practicable flow rate for high flow rate injectors 454 is equivalent to the maximum flow rate of low flow injectors 456. This allows wide-scale changes in fuel delivery rate to be accommodated without undesirable discontinuities. This is accomplished by using electronically controlled injectors which are opened for variable periods of time, with such periods being termed pulse width. This method is shown in FIG. 12. Accordingly, when hydrogen flow is being increased, as when the answer to the question posed at block 1214 is "yes", the pulse width of low flow injectors 456 will be increased by controller 914 to an overlap flow rate value at block 1126, at which time high flow injectors 454 will be operated with a pulse width corresponding to the overlap value at block 1218. Simultaneously at block 1218, the pulse width of low flow injectors 456 will be reduced such that the total flow from both sets of injectors is the same as the previous overlap flow rate from low flow injectors 456. Thereafter, the flow rate of high flow injectors 454 may be further increased by controller 914, and the flow rate of low flow rate injectors may be further decreased, until low flow rate injectors 456 are shut off. In cases where fuel delivery is being decreased from a high fuelling rate, the pulse width of the high fuel rate injectors 454 will be decreased at block 1222 to the overlap value, and at block 1224 low rate injectors 456 will be operated at the overlap value, while high rate injectors 456 are simultaneously turned off.

The ability to rapidly control the hydrogen fuel flow is important for at least one additional reason with the present powertrain system. Because backfiring in the intake manifold of a port-injected hydrogen fuelled reciprocating internal combustion engine may be a problem in certain operating regimes, engine 400 has a temperature and absolute pressure (TMAP) sensor 447 mounted in intake plenum 449 (FIG. 4).

TMAP sensor is employed in a method to control backfire, as illustrated by means of a flow chart in FIG. 13. Backfiring typically causes an almost instantaneous increase in intake manifold temperature and sometimes, pressure. At block 1312, TMAP sensor 447 continuously senses these intake plenum temperature and pressure. Then, at block 1314, engine controller 914 compares the measured values for temperature, and if desired, pressure, to predetermined threshold values. If the answer to the question at block 1314 is "no, the routine merely continues. If the answer is "yes", the routine proceeds to block 1316, wherein controller 914 cuts of the fuel by setting the injector pulse widths to zero. Then at block 1318, controller 914 checks to see whether the sensors and elapsed time indicate that the backfire has ceased. If so, fuelling will be resumed at block 1320. During the period of non-fuelling, the electrodrive system may be used at block 1322 to compensate for the torque deficit which would otherwise occur. Of course, electrodrive assist will be available only if various conditions are met, such as adequate battery state of charge, suitable road speed, and other conditions.

Spark plugs 460 (only one shown) are electrically coupled to an ignition system 462, preferably a so-called "coil-on-plug" ignition system, which is also controlled by the ECM 914.

Engine 400 further includes at least one air charge boosting device 436, such as a centrifugal-type supercharger, for increasing the power output of the engine. In one embodiment of the present invention, a centrifugal supercharger is belt driven from the engine's front end accessory drive (FEAD) and nominally provides 90 kpa (gage) boost at an engine speed of 5000 rpm. Supercharging, however, has the undesired effect of heating the intake air and thus making the engine more susceptible to pre-ignition. This ultimately limits the power output of the engine. Therefore, to minimize air heating, a dual-stage intercooling system is provided as described in U.S. application Ser. No. 09/683,072, which is owned by the present assignee and is hereby incorporated by reference in its entirety. The dual-stage intercooling system includes an air-to-air intercooler 438 in communication with the supercharger 436, and an air conditioning-to-air intercooler 442 disposed downstream of the air-to-air intercooler 438 for further reduction of air temperature. Nominally, the air conditioning-to-air intercooler 442 is operated under high boost conditions using R-134 as the cooling medium.

Oil consumption control measures are provided to prevent auto-ignition and to substantially reduce carbon-based and nitrous oxide emissions. Accordingly, cylinder 402 is machined, using deck plate cylinder bore honing, to optimise the geometry of the cylinder walls. The end gaps of the piston rings in ring pack 411 are optimised for increased pressure and reliability, as are the valve stem seals to minimize oil pull-by and to improve wear resistance.

A positive crankcase ventilation (PCV) system incorporating separator 452 and check valves 446 and 448, as well as venturi 434, is also included to remove oil vapour from crankcase gases. Such a system is described for example in U.S. Pat. No. 6,606,982, which is owned by the present assignee and hereby incorporated by reference in its entirety. The PCV system is an emission control system designed to extract combusted and partially combusted gases from the crankcase and re-burn them, and in particular can be used with a pressurized/vacuum induction system to provide improved oil/air separation.

As a result of the lean air/hydrogen fuel mixture, supercharging and intercooling, engine 400 of FIG. 4 is optimised for maximum efficiency, power and range. In addition, the oil control measures described above serve to substantially minimize hydrocarbon, NOx, and CO2 emissions of engine 400.

Figure 5:
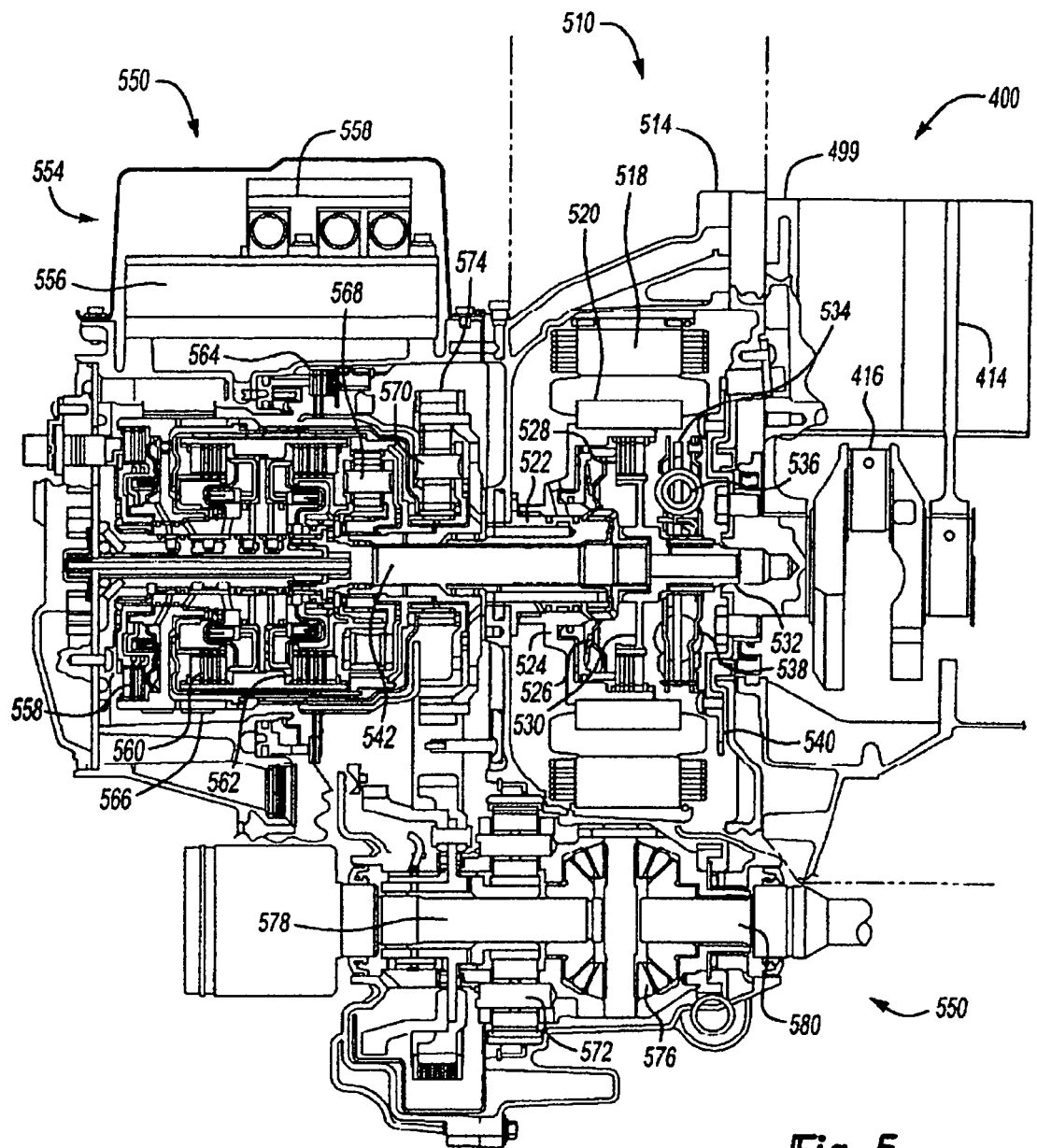
FIG. 5 is a schematic diagram showing an embodiment of a modular hybrid power transmission system for use in the hybrid powertrain of FIG. 3.

FIG. 5 shows a cross-sectional view of an exemplary hybrid powertrain 500 system in accordance with the present invention. The powertrain 500 allows for "full" hybrid functionality, including engine start/stop, engine boost, regenerative braking (kinetic recovery) and electric drive. The powertrain system 500, from left to right, includes a hydrogen-fuelled internal combustion engine 400, integrated motor-generator(M-G)/disconnect clutch assembly 510 and power transmission assembly 550. Preferably, the assemblies 510 and 550 are packaged together as a "modular hybrid transmission system," which is identified as for example as reference numeral 122 in FIG. 1. The modular hybrid transmission system is now described below, and further described in U.S. Pat. No. 6,585,066, which is owned by the present assignee and hereby incorporated by reference in its entirety. An alternative embodiment is described in U.S. Pat. No. 6,176,080, which is also owned by the present assignee and hereby incorporated by reference in its entirety Referring to FIG. 5, the integrated M-G/disconnect clutch assembly 510 includes a housing 514 disposed between the hydrogen internal combustion engine 400 and the power transmission assembly 512. The housing to an engine block 499 on one end and to a transmission housing 552 on the other is attached via bolts or other suitable attachment means. The housing 514 serves as an enclosure for an electric motor-generator, a "wet clutch" assembly and a damper assembly. Nominally, the electric motor-generator is an induction type electric machine having a stator 518 and a rotor 520 and a maximum power output of at least 25 kW. The actual sizing of the motor-generator however can depend on the power output requirements of the powertrain and the electrical power capabilities of a corresponding electrical storage device.

The wet clutch assembly, which replaces a conventional hydrokinetic torque converter, is axially mounted within the rotor 520 on a support bearing shaft 522 attached to the transmission housing. The clutch assembly includes a wet clutch cylinder 524 for housing an annular piston 526 that cooperates with the cylinder 524 to form a pressure chamber. The pressure chamber is fed by a plurality of hydraulic pressure passages (not shown) and used to actuate a plurality of clutch plates 528 mounted on a clutch support element 530. When the clutch plates are released, the hybrid powertrain 500 can be operated in an electric mode since the motor-generator torque is the only torque transmitted to a transmission input shaft 542. With the clutch released, the powertrain can also be operated in a kinetic recovery or regenerative braking mode. When the clutch plates 528 are engaged, the engine is mechanically coupled to the transmission input shaft 542 thereby supplementing the motor-generator torque, if any, at the transmission input. With the clutch is engaged, the powertrain 500 can be operated in an engine only mode, or a combined engine/motor mode (e.g., launch assist), and the electric motor-generator used for start/stop operations for the engine.

Although a wet-clutch assembly is preferred, the invention claimed herein can also utilize a dry friction element. The wet clutch assembly however is preferred because it exhibits more stable friction characteristics as compared to a dry element as described in U.S. Pat. No. 6,176,080. In addition, by way of the wet clutch design, spraying of the electric motor 518, 520 with transmission fluid allows for cooling of the motor end windings that in turn improves constant power operation of the motor. Also, packaging costs are reduced by the using bushings to mount the rotor 520 instead of bearings.

The damper assembly is provided to minimize torsional vibrations from the hydrogen-fuelled internal combustion engine. The assembly includes a hub 532, damper drive plate 534, damper springs 536, damper housing 538, and crankshaft drive plate 540. As shown in FIG. 5, the hub 532 communicates with clutch support element 530 and a damper drive plate 534. The damper drive plate 534 in turn communicates with damper springs 536, which are selected or tuned to further minimize the torsional vibrations of the hydrogen-fuelled internal combustion engine. The damper springs 538 in turn cooperate with a damper housing 538, which is mechanically secured to a crankshaft drive plate 540. The crankshaft drive plate 540 is in turn secured to the crankshaft 416.

The modular hybrid transmission system of FIG. 5 further includes the power transmission assembly 550. By nature of the system's modular design, the transmission assembly 550 can be any manual, automatic or continuously variable transmission suitable for both hybrid and non-hybrid applications. By way of example only and not limitation, the transmission assembly described herein with reference to FIG. 5, by way of example and not limitation, is modified version of ZF-Batavia's CD4E 4-speed automatic transmission. Other transmission and gearing configurations can be used without affecting the scope of the claimed invention.

The power transmission assembly 550 includes a hydraulic control assembly 554 disposed one side of the transmission housing 552. The hydraulic control assembly 554 includes valve compartment 556 and an electronic module 558 for housing electronic switching components. The hydraulic control assembly 554 is used to engage and disengage the disconnect clutch assembly described above, along with the various clutch devices disposed with the transmission 550. A small electric pump (not shown) integrated into the valve compartment 552 maintains a required amount of hydraulic pressure to the transmission assembly 550 during engine shut down.

With respect to the present embodiment, the transmission 550 includes five individual clutch/frictional elements for providing at least four forward driving gear ratios and one reverse gear ratio: reverse clutch 558, direct clutch 560, forward clutch 562, low-and-reverse brake 564 and break band 566. Each of the clutch/frictional elements 558, 560, 562, 564 and 566 are configured via planetary gear sets 568, 570 and 572 and chain 574 to yield the forward and reverse gear ratios as described in detail in the above-reference U.S. Pat. No. 6,585,066. The resulting torque is transmitted through planetary gearset 572 to differential gear 576, and ultimately to half-shafts 578 and 580. Optionally, an additional or modified gearing device is provided at the output of planetary gearset 572 to provide four-wheel drive capability.

As such, a very low emissions "parallel" hybrid powertrain system is achieved by combining the modular hybrid transmission system of FIG. 5 with the hydrogen internal combustion engine of FIG. 4. With a parallel hybrid system, the powertrain can operate with only one of the hydrogen engine or electric motor as the power generating source, or both the engine and motor when extra power is required. The hybrid powertrain enables a regenerative braking function that recovers kinetic energy as electrical energy that otherwise would be lost as heat energy during braking. The recovered electrical energy for example can be used to power the vehicle, at least partially, during a subsequent launch, acceleration, passing or hill climbing maneuver. The powertrain also enables electric vehicle mode operation, and engine start/stop. With engine start/stop, for example, the engine can be automatically turned off to save fuel and lower emissions. When the brake pedal is released and the accelerator applied, a vehicle systems controller seamlessly controls the electric motor to re-start the engine and re-engage the disconnect clutch.

Reference is now made to FIGS. 6 through 8, which illustrate the advantages of the hydrogen-fuelled hybrid powertrain system described with reference to FIGS. 4 and 5. Curves 610-650 each show a maximum engine output torque (Nm), i.e., the crankshaft torque available at the transmission input drive shaft, over a wide range of engine operating speeds. Curve 610 shows a torque/speed characteristic for a conventional 2.3L gasoline-fuelled internal combustion engine. Over an operating range of 1000-5000 rpm, the maximum engine torque for the gasoline-fuelled internal combustion engine varies from approximately 160 Nm (at 1000 rpm) to approximately 210 Nm (at 4000 rpm). This represents a variation of approximately 23.8% from the peak maximum value. By comparison, curves 620-650 for the same engine fuelled with hydrogen and constructed as described with reference to FIG. 4 achieves greatly diminished power output performance. Curve 650, the hydrogen-fuelled engine with no supercharging, shows a maximum output torque of approximately 120 Nm as compared to 210 Nm for the gasoline engine. Although supercharging improves performance, e.g., curves 620, 630 and 640 for 100%, 40% and 20% supercharging, respectively, the benefits of supercharging are not evident below 2500 rpm. "% supercharging (or boost)" herein refers to the % above atmospheric pressure the boost device pressurizes the inlet charge, e.g., a 25% boost is a pressure ratio of 1.25:1 or a boost of 14.7 psi*1.25=18.3 psi. Above 2500 rpm, only the 100% supercharging case (curve 620) comes closest to gasoline engine performance. With 100% supercharging, the percent variation from the peak maximum value over the 1000-5000 rpm range is approximately 57.4% ((202-85.66)/202*100). In particular, for a low speed range of operation, i.e., below 2500 rpm, the maximum torque output of the engine is significantly reduced as compared to output over at the higher speed, i.e., 5000 rpm.

Although the combination of lean air/fuel operation, supercharging and intercooling optimises performance of the hydrogen engine, power output is significantly reduced compared to convention gasoline-burning internal combustion engines. Diminished performance is especially evident at lower operating speeds of the engine, where the benefits of supercharging are not fully realized. This performance deficit, especially over powertrain operating speeds below 2500 rpm, is substantially overcome by the use of the hydrogen hybrid powertrain described with reference to FIGS. 3-5.

FIG. 7 shows maximum output torque characteristics for the hydrogen hybrid powertrain described above with reference to FIGS. 3-5. Curves 720-750 show the maximum torque available at the transmission input drive shaft over a wide range of powertrain operating speeds. Most notably, due in part to the low speed performance characteristics of the electric motor generator, torque performance is greatly improved for operating speeds below 2500 rpm. And, when supercharging at levels above 40%, performance is greatly enhanced for operating speeds greater than 2500 rpm. With 100% supercharging, the percent variation from the peak maximum value over the 1000-5000 rpm range is approximately 21%, which is comparable to the conventional gasoline-fuelled engine. In addition, the average maximum output is increased as compared to the gasoline case.

FIG. 8 shows the advantages of the hydrogen hybrid system in terms of maximum power output. Again, with increased supercharging, i.e., curves 820 (100% supercharging), 830 (40% supercharging), 840 (20% supercharging) and 850 (0% supercharging), the power output of the powertrain exceeds the gasoline-fuelled engine, curve 810. With supercharging above 40%, the power producing characteristics of the hydrogen engine and modular hybrid transmission complement each other over the operating speed range of the powertrain.

The combination of a hydrogen-fuelled internal combustion engine with the modular hybrid transmission thus allows for enhanced power performance as compared to conventional gasoline-powered engine, but with substantially reduced $CO_2$ emissions and only a fraction of hydrocarbon and nitrous oxide emissions. In addition, the combination allows for "full" hybrid functionality, e.g., engine start/stop, engine boost, regenerative braking (kinetic recovery) and electric drive, which further reduces emissions and improves fuel economy.

FIG. 9 shows a block schematic diagram of an exemplary hydrogen-fuelled internal combustion engine hybrid vehicle 900 according to the present invention. The vehicle includes a hydrogen-fuelled, supercharged 2.3L internal combustion engine 902 with electronic throttle, an electric converterless modular hybrid transmission system 904 with a 25 kW electric motor/generator and corresponding power electronics 905, a 280-volt lithium ion battery 906, a compressed hydrogen gas storage system 908, and corresponding hydrogen detection sensors 910. The vehicle includes several control modules, which may be implemented separately or together on one or more on-board microprocessor devices communicating over one or more high-speed on-board communications networks, including but not limited to a vehicle system controller (VSC) 912, an engine control and fuel injection module (ECM/FIM) 914, an electric power assist steering (EPAS) module 916, a transmission control module (TCM) 918, a battery control module (BCM) 920 and a hydrogen management module 922. TCM 918 reads inputs from the vehicle, such as pedal position, PRNDL position, speeds (e.g., transmission input, transmission output, transmission gear speeds, engine, etc.), engine and motor torque and pressures (e.g., fwd/rev clutch and line) to control the pressure on the various liners solenoids (VFS) and small electric pump. Preferably, TCM 918 also controls vehicle launch, engine-wheel disconnect, engagement, engine start, driveline oscillation during tip-in/out and transmission gear shifting. The fuel tanks in one embodiment can be aluminium pressure barriers with a carbon-fibre structural casing rated for an operating pressure of 5000 to 10,000 psi.

FIGS. 10 and 11 show isometric views of a hydrogen hybrid powertrain 1000 and arrangement thereof in a hydrogen hybrid vehicle 1100. The hydrogen hybrid vehicle 1100 includes the internal combustion engine 902 and modular hybrid transmission system 904 constructed and arranged within the engine or forward compartment of the vehicle 1100. Energy storage devices, including high voltage battery 906 and hydrogen storage tanks 1112, 1114 and 1116, are housed in the storage or rear compartment of the vehicle 1110. Alternatively, one or more of the storage tanks or battery can be housed in a mid-section of the vehicle, for example under the passenger seat of floor pan of the vehicle 1100.

Referring again to FIG. 10, the key components of the hydrogen hybrid powertrain include a front end accessory assembly 1010, a centrifugal supercharger assembly 1028, dual fuel rails 1030 and 1032, an electric traction motor 1040, hydraulic valve assembly 1042, and power electronics and control module 1044. The electric traction motor 1040 is nominally a 25 kW peak/10 kW continuous power induction motor, but can be sized accordingly depending on the weight of the vehicle, application or other design criteria known and appreciated in the art. Other key components and arrangements thereof are shown in FIG. 11 and include an air-to-air intercooler 1102, an air-to-air conditioner intercooler 1104, the high voltage battery 906, battery cooling inlet and outlet assemblies 1108 and 1110, the hydrogen storage tanks 1112, 1114 and 1116, and hydrogen fuelling receptacle 1118. The hydrogen tanks in one embodiment store compressed hydrogen gas, for example at 5000 or 10,000 psi. Alternative storage systems include super insulated liquid and metal hydride storage systems.

The vehicle further includes a ventilation system (not shown) for active and passive ventilation of hydrogen gas, which is described in U.S. Pat. No. 6,446,616, which is also owned by the present assignee and hereby incorporated by reference in its entirety.

By nature of the hydrogen hybrid powertrain 1000 having a higher compression ratio, faster fuel burning rate, a supercharger, electric motor, and active and passive ventilation, the vehicle 1110 and components thereof tend to produce elevated levels of noise, vibration and harshness (NVH) as compared to conventional non-hybrid gasoline-powered vehicles. The FEAD assembly 1010, which includes crankshaft pulley 1012, water pump pulley 1014, supercharger pulley 1016, belt tensioner 1018, first idler 1020, air conditioner pulley 1022, second idler 1024 and belt 1026, for example is optimised to minimize NVH. The supercharger pulley 1016, includes a one-way clutch that allows the supercharger 1028 to free wheel in one direction so as prevent belt slippage and minimize belt "squeal". This clutch system is similar to a clutch which is described in U.S. Pat. No. 5,669, 336, which is also owned by the present assignee and hereby incorporated by reference in its entirety. A belt 1026 having a lower (or higher) coefficient of friction also reduces belt squeal. The crankshaft pulley 1012, also optimised to reduce NVH, includes a dual damper arrangement of soft and hard rubber material to dampen different noise frequencies. The belt tensioner 1018 is nominally a "slack side" tensioner having a higher dampening and positioned so as to reduce tensioner travel and FEAD "slapping" noise.

To further reduce NVH, the engine 902 and transmission system 904 are surrounded or encased by sound absorbing materials. A first barrier made of one or more sound absorbing materials, such as Thinsulate or other foam materials, for example can be used in between the engine and passenger compartments. A second barrier in the form of a foam hood liner can also be used to suppress noise. Still further, a third layer arranged as a supercharger "belly pan" can be used to reduce noise radiated by the supercharger. In one embodiment, the belly pan is constructed from a sheet metal material and lined with sculptured foam to reduce radiated noise leakage from the supercharger assembly 1028.

Optionally, the intake and exhaust systems of the internal combustion engine can be designed to further reduce noise. For example, a tubular muffler 1120 tuned to 87 Hz packaged in an underbody tunnel area of the vehicle can reduce noise as much as 2 dB. A Helmholtz resonator (see 491 in FIG. 4) tuned to 133 Hz installed between the air box and supercharger can be used to minimize intake noise. These and other methods known in the art can be used to minimize noise emanating from the intake and exhaust systems of the hydrogen hybrid powertrain.

The invention claimed is:

1. A powertrain, comprising:
   a primary power generating system for generating a primary drive torque, the primary power system having a hydrogen-fuelled internal combustion engine operating with a lean hydrogen gas fuel mixture, the internal combustion engine having at least one air charge boosting device for increasing the primary drive torque at a first range of operating speeds of the powertrain; and
   a secondary power generating system having at least one electric torque generating device for generating a secondary drive torque, the secondary power generating system being constructed and arranged such that the secondary drive torque complements the boosted primary drive torque over at least a second operating speed range of the powertrain that is lower than the first range of operating speeds.

2. A powertrain according to claim 1, wherein the primary power generating system comprises at least one intercooling device.

3. A powertrain according to claim 1, wherein the primary power generating system comprises a dual stage intercooler.

4. A powertrain according to claim 1, wherein the primary power generating system comprises a front end accessory assembly optimised for reducing noise, vibration and harshness (NVH) associated with the powertrain.

5. A powertrain according to claim 1, wherein the primary power generating system is shielded with a sound absorbing baffler to reduce NVH emanating from the air charging device.

6. A powertrain according to claim 1, wherein the secondary power generating system comprises an electrical motor/generator.

7. A powertrain according to claim 1, further comprising a disconnect clutch disposed between the primary generating power system and the secondary power generating system for engaging and disengaging the primary power generating system from the secondary power generating system and for transferring the boosted primary driver torque through the secondary power generating system.

8. A powertrain according to claim 1, further comprising a power transmission system coupled to the output of the secondary power generating system for receiving a combination of the boosted primary drive torque and the secondary drive torque, the combination of the boosted primary drive torque and the secondary drive torque having an enhanced torque characteristic over at least a low operating speed range of the powertrain.

9. A powertrain according to claim 1, further comprising:
   a disconnect clutch disposed between the primary generating power system and the secondary power generating system for engaging and disengaging the primary power generating system from the secondary power generating system and for transferring the boosted primary driver torque through the secondary power generating system; and
   a power transmission system coupled to the output of the secondary power generating system for receiving a combination of the boosted primary drive torque and the secondary drive torque, the combination of the boosted primary drive torque and the secondary drive torque having an enhanced torque characteristic over at least a low operating speed range of the powertrain, the secondary power generating system, the disconnect clutch and the power transmission system being packaged as a modular hybrid transmission system.

10. The powertrain of claim 1, wherein the first range of operating speeds of the powertrain is greater than approximately 2500 revolutions per minute.

11. The powertrain of claim 10, further comprising a transmission, and wherein the operating speeds of the powertrain is the input speed to the transmission.

12. The powertrain of claim 10, further comprising:
    a low flow rate fuel injector for injecting fuel into the engine when the engine is operating within a first engine speed range; and
    a high flow rate fuel injector for injecting fuel into the engine when the engine is operating within a second engine speed range at least some of which is higher than the first engine speed range.

13. The powertrain of claim 12, wherein the fuel injectors have variable injection flow rates controlled by pulsing the injectors on and off.

14. The powertrain of claim 13, wherein the low flow rate fuel injector is operable over a first range of flow rates and the high flow rate fuel injector is operable over a second range of flow rates, an upper portion of the first range of flow rates overlapping with a lower portion of the second range of flow rates.

15. A powertrain, comprising:
    a primary power generating system for generating a primary drive torque, the primary power system having a hydrogen-fuelled internal combustion engine operating with a lean hydrogen gas fuel mixture, the internal combustion engine having at least one air charge boosting device for increasing the primary drive torque;

a secondary power generating system having at least one electric torque generating device for generating a secondary drive torque, the secondary power generating system being constructed and arranged such that the secondary drive torque complements the boosted primary drive torque; and a control system including at least one control module and configured to:

control the at least one air charge boosting device to increase the primary drive torque over a first range of powertrain operating speeds, and control the secondary power generating system to boost primary drive torque over a second range of powertrain operating speeds at least a portion of which is lower than the first range of powertrain operating speeds.

16. The powertrain of claim 15, wherein the first range of powertrain operating speeds is greater than approximately 2500 revolutions per minute.

17. The powertrain of claim 15, further comprising a transmission, and wherein the operating speeds of the powertrain is the input speed to the transmission.

18. The powertrain of claim 15, further comprising:

a low flow rate fuel injector for injecting fuel into the engine when the engine is operating within a first engine speed range; and a high flow rate fuel injector for injecting fuel into the engine when the engine is operating within a second engine speed range at least some of which is higher than the first engine speed range.

19. The powertrain of claim 18, wherein the fuel injectors have variable injection flow rates controlled by pulsing the injectors on and off.

20. The powertrain of claim 19, wherein the low flow rate fuel injector is operable over a first range of flow rates and the high flow rate fuel injector is operable over a second range of flow rates, an upper portion of the first range of flow rates overlapping with a lower portion of the second range of flow rates.

* * * * *

UNITED STATES PATENT AND TRADEMARK OFFICE
CERTIFICATE OF CORRECTION

PATENT NO. : 7,608,011 B2
APPLICATION NO. : 10/541055
DATED : October 27, 2009
INVENTOR(S) : Grabowski et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 749 days.

Signed and Sealed this

Twelfth Day of October, 2010

David J. Kappos
*Director of the United States Patent and Trademark Office*